June 23, 1936.  E. KRAMAR  2,044,852

ELECTRIC INDICATOR FOR COMPARING FIELD INTENSITIES

Filed Nov. 18, 1933

*Fig. 3*  *Fig. 4*

Inventor:
Ernst Kramar
by R.C. Hopgood
Attorney

Patented June 23, 1936

2,044,852

UNITED STATES PATENT OFFICE 2,044,852

ELECTRIC INDICATOR FOR COMPARING FIELD INTENSITIES

Ernst Kramar, Berlin-Tempelhof, Germany, assignor to C. Lorenz Aktiengesellschaft, Berlin-Tempelhof, Germany, a company Application November 18, 1933, Serial No. 698,619
In Germany December 12, 1932

1 Claim. (Cl. 177—352)

This invention relates to receiving arrangements for comparing the intensities of high frequency electromagnetic fields with each other. Devices of this kind are employed for instance on aircraft in order to indicate to the pilot whether he is on or off the course to be followed, the craft moving within the angle between two electromagnetic radiations. The fields are to such end influenced by signals produced for instance by means of the well-known $a$—$n$ method or by a method wherein one of the two fields is influenced in a well-known manner by a sequence of dashes, and the other by a sequence of dots, such signals serving to distinguish the fields from one another. In this way, on the pilot deviating from the proper course, this fact is indicated to him by one signal preponderating over the other, and from the signal in preponderance he may ascertain whether the craft is on the right or left hand side of the desired course.

The object of the invention is to provide a simple and effective means for giving a visual indication when the intensity of one electromagnetic field preponderates over that of another.

According to the invention, in a receiving arrangement for use in a radio direction finding or course indicating system in which a direction or course is indicated by a comparison of electromagnetic field intensities, the signals are conveyed over a transformer to an indicating instrument which is very sensitive in the vicinity of its normal position and relatively insensitive in the range of maximum deflection. As will be seen from the following detailed description by the use of such an instument persistent indications are given which are readily observable.

We are aware that such indicating instruments, which are very sensitive in the vicinity of their normal position and relatively insensitive in the range of maximum deflection, have been used for other purposes and we make no claim to their construction per se.

Figure 1:
Figure 1:
Figure 2:
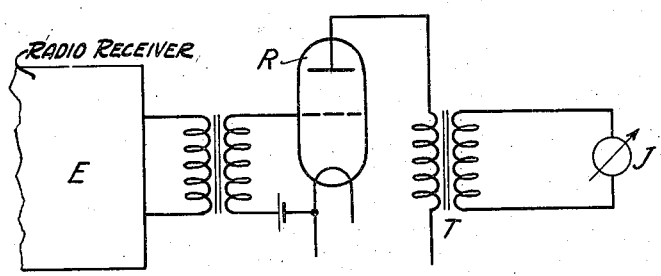
Figure 2:
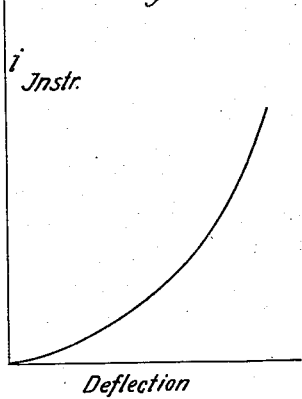
Figure 2:
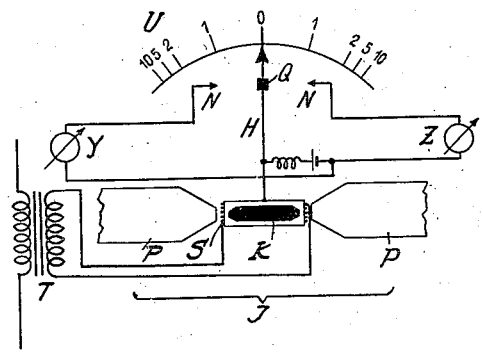

The invention and its advantages will be fully understood from the following description and be particularly pointed out in the appended claim, reference being had to the accompanying drawing in which Fig. 1 is a diagram that illustrates the known dot and dash keying. Fig. 2 is a diagrammatic representation of a receiving arrangement to which the indicating device is connected. Fig. 3 shows the sensitivity curve of this indicating device. Fig. 4 is a diagrammatic representation of the device and of a modification referred to hereafter.

In Fig. 1 the dot keying is illustrated in a customary manner by line I, the dash keying by line II. The dots and dashes are displayed by hatching. The part I of each dot denotes the beginning of the dot, 2 the end thereof.

The arrangement shown in Figs. 2 and 4 can be disposed for example on an aircraft, vessel or other means of transportation, in order to receive the radiations from a radio beacon.

The receiver is denoted by E, Fig. 2. R indicates a rectifier that may be of any suitable type, but is shown here as a valve rectified. T denotes a transformer, J the indicating device.

The indicating device J, illustrated in Fig. 4, is a rotary coil instrument of the general type disclosed in U. S. Patent 1,782,588 dated November 25, 1930. P denotes the two pole pieces, K the fixed core, S the rotary coil, H the pointer carried by this coil, U the scale.

The keyed radiation from a radio beacon, for example, is received at E. The humming signals proceeding therefrom are rectified by the valve R and conveyed over transformer T to the coil S of the indicating device J.

Whenever one of the signals I, II represented in Fig. 1 preponderates over the other, then the pointer H is deflected in a well-known manner in one or the other direction. If there is no such preponderance the pointer remains in the zero position, as shown in Fig. 4, thus indicating that the craft is on the proper course.

In this position the air gaps between S, P and S, K are smallest and correspond approximately to the magnitude normal with such instruments.

As will be seen from Fig. 4, the pole pieces P and the core K are tapered toward the coil S. Consequently, whenever the members S, P come out of the normal position the said air gaps increase considerably so that the device J becomes more and more insensitive.

The moving coil S of the indicating instrument J is connected directly in circuit with the secondary winding of transformer T as shown in Fig. 4, no source of current being necessary in said circuit. As will be explained more in detail presently, it will be seen that by reason of the indicating instrument J being coupled to the output circuit of rectifier R by means of the transformer T, the dot and dash signals are perceptible in the circuit of the instrument J in the form of potential impulses which occur on the rises and falls of current at the commencement and end of the dot and dash signals. Referring to Fig. 1, it is to be observed as previously explained, that the commencement or beginning of a dot coincides with the ending of a dash and that the ending of a dot coincides with the beginning or commencement of a dash. As is well known, the potential impulses in the secondary winding of a transformer which result from the rise or fall of the current in the secondary winding thereof produce current impulses which flow in the secondary circuit, consequently, the current impulses thus produced in the secondary winding of transformer T flow in the circuit including the movable coil or winding of indicating instrument J. It is also well known that the polarity of such current impulses is determined by the rise or fall of the current in the primary winding, being of one polarity upon such a rise of current and of the opposite polarity upon such a fall of current. It will be evident, therefore, that the polarity of such current impulses flowing in the coil S determine the direction of movement of the needle H thereof. If the instrument J were of the ordinary type the flow of these current impulses through the coil S thereof, would result only in momentary flicks of the needle or pointer H, which would be difficult or even impossible to observe.

According to the invention, the instrument J is of the kind which is very sensitive in the vicinity of its zero position but relatively insensitive in the range of maximum deflection, the sensitivity falling rapidly as the pointer is deflected out of the normal. It is easy to see that if the aircraft is on the predetermined course where the dot and dash signals are of exactly equal intensity, the potential impulses in the circuit of the instrument J, induced at the commencement and ends 1, 2 (Fig. 1) of the dots and dashes, exactly neutralize each other and the pointer H will remain in its zero position.

Assuming that the aircraft deviates from its course and is in such a position that the intensity of the dots preponderates over that of the dashes, at the commencement 1 (Fig. 1) of a dot signal the rise in current in the input circuit of R, due to the dot signal, will be greater than the fall in current due to the cessation of the dash signal. A current impulse of one polarity will, therefore, be delivered to the instrument J, the pointer H of which will move to one side, say the right, to a point of relatively low sensitivity. On the cessation of the dot and the commencement of the next dash another similar current impulse, but in the reverse direction that is of opposite polarity, will be delivered to the instrument J, but as the coil S is in a relatively insensitive position and has a relatively large inertia it is not substantially influenced by this retroactive potential impulse. When, however, the next dot signal is received, if the pointer has during the interval returned to zero, it will again be deflected to the right. It is, however, not absolutely necessary for the pointer of the instrument to have gone completely back to zero before the next signal arrives. It is sufficient for the pointer to have dropped from its maximum swing, for example, to one-third of the value. According to the speed of keying, the pointer will return to a greater or lesser extent towards zero in the pauses between the signals. It will be seen, therefore, that the movements of the pointer are to one side of the zero only and, being of a persistent nature, are easily observable.

If the aircraft has, on the other hand, deviated to the other side of the desired course the dashes will preponderate over the dots. At the point 1 (Fig. 1) on the commencement of a dot, therefore, the potential impulse due to the cessation of the dash will preponderate over the impulse due to the commencement of the dot. The resultant current impulse through coil S will be of such polarity as to cause the pointer H to move to the left. The retroactive impulse at the commencement of the next dash following the dot will not substantially influence the instrument. Thus, the pointer H will show slow deflections to the left which are easily observable.

The operation of the arrangement described depends in part upon the length of the signals and the time which is required by the device J in order to bring the pointer H into the maximum deflection, and may therefore be influenced in a favourable manner by choosing these particulars accordingly.

The device J may be a contact instrument, that is the pointer may be arranged to close electric circuits in order that remote indication or remote control shall be possible. A diagrammatic representation of an example of such modification is contained in Fig. 4. The pointer H has a contact member Q adapted to coact with contact members N, so as to cut in electrical indicators Y, Z. These are shown as indicating devices but may be apparatus of any other kind.

The sensitivity of the device J may be effected in the meaning of the invention in any other manner than that described herebefore. For example, instead of tapering both the members P and K, only P or only K may be tapered or constructed in any other manner adapted for the purpose.

The arrangement described, or modifications thereof that may be made within the scope indicated by the appended claim, may be employed not only for purposes connected with radio beacons but generally where a comparison of field intensities is to be effected for any purpose.

What is claimed is:

A receiving arrangement for use in a radio direction finding or course indicating system in which a direction or course is indicated by comparison of the electromagnetic field intensities, comprising a rectifier, means for impressing signals on said rectifier, an indicating instrument which is very sensitive in the vicinity of its normal position and relatively insensitive in the range of the maximum deflection, and a transformer coupling the rectifier to said indicating instrument.

ERNST KRAMAR.